United States Patent [19]

Sinha

[11] Patent Number: 4,503,019

[45] Date of Patent: Mar. 5, 1985

[54] BLENDS OF MAGNESIUM OXIDE AND COPPEROXYCHLORIDE AS CALCIUM OXIDE DEPOSIT INHIBITORS IN COAL FIRED LIME KILNS

[75] Inventor: Rabindra K. Sinha, Coraopolis, Pa.

[73] Assignee: Calgon Corporation, Pittsburgh, Pa.

[21] Appl. No.: 598,766

[22] Filed: Apr. 10, 1984

[51] Int. Cl.³ .................... C01F 11/04; C01F 11/06
[52] U.S. Cl. ................................. 423/175; 423/637
[58] Field of Search .................... 423/175, 177, 637

[56] References Cited

U.S. PATENT DOCUMENTS

| | | | |
|---|---|---|---|
| 1,113,178 | 10/1914 | Akers | 423/177 |
| 1,627,215 | 5/1927 | Truesdell | 423/175 |
| 1,634,505 | 7/1927 | McCaughy | 423/175 |
| 2,282,584 | 5/1942 | Hill | 423/175 |
| 2,845,338 | 7/1958 | Ryznar et al. | 44/50 |

FOREIGN PATENT DOCUMENTS

| | | | |
|---|---|---|---|
| 238929 | 8/1925 | United Kingdom | 423/175 |
| 436443 | 10/1935 | United Kingdom | 423/175 |
| 537539 | 6/1941 | United Kingdom | 423/175 |

OTHER PUBLICATIONS

Boynton, *Chemistry and Technology of Lime and Limestone*, John Wiley & Sons, (1966), pp. 246–252.

Kiss, L. T., et al. "The Use of Copperoxychloride to Alleviate Boiler Slagging", *Journal of the Institute of Fuel*, Apr. 1972, pp. 213 through 223.

*Primary Examiner*—John Doll
*Assistant Examiner*—Wayne A. Langel
*Attorney, Agent, or Firm*—Michael C. Sudol, Jr.; R. Brent Olson; William C. Mitchell

[57] ABSTRACT

The instant invention is directed to a method of inhibiting and dispersing calcium oxide deposit formation in coal-fired lime kilns, comprising burning the coal in the presence of from 1 to 2 pounds/ton of coal of a blend of 80 to 95%, by weight, magnesium oxide and 5 to 20%, by weight, copperoxychloride.

1 Claim, No Drawings

BLENDS OF MAGNESIUM OXIDE AND COPPEROXYCHLORIDE AS CALCIUM OXIDE DEPOSIT INHIBITORS IN COAL FIRED LIME KILNS

BACKGROUND OF THE INVENTION

This invention relates to the addition of blends of magnesium oxide and copperoxychloride to inhibit the deposition of calcium oxide deposit in coal-fired lime kilns.

The use of copperoxychloride to inhibit deposit formation is disclosed in Kiss, L. T., et al., "The Use of Copperoxychloride to Alleviate Boiler Slagging", *Journal of the Institute of Fuel*, April 1972, pages 213 through 223.

U.S. Pat. No. 2,845,338 discloses the use of blends of magnesium oxide and copperoxychloride to inhibit deposit in coal-fired boiler furnaces. The percent of calcium oxide deposit in these furnaces is generally less than ten percent. The principal deposits are $SiO_2$, $Al_2O_3$, and $Fe_2O_3$.

Formation of heavy calcium oxide deposits on the walls of coal-fired lime kilns is known as "coal ring". The "ring" reduces the effective diameter of the kiln, increasing the pressure drop across its length.

Since the secondary air for combustion is provided by fans, any increase in pressure drop adversely affects the firing rate and hence the kiln's productivity. Generally the buildup is removed by shooting the deposit with industrial size shot gun shells, known as "shoot out".

The process of the instant invention does not eliminate the "shoot out" requirements, but does significantly reduce the frequency for "shoot out".

DESCRIPTION OF THE INVENTION

The instant invention is directed to a method of inhibiting and dispersing calcium oxide deposit formation in coal-fired lime kilns, comprising burning the coal in the presence of from 1 to 2 pounds/ton of coal of a blend of 80 to 95%, by weight, magnesium oxide and 5 to 20%, by weight, copperoxychloride.

The blend of copperoxychloride and magnesium oxide may be fed continuously to the coal or added periodically, preferably 0.1 to 5 pounds/ton of coal, preferably 0.5 to 3 pounds/ton of coal, based on the total coal burned.

EXAMPLE

A blend of 92%, by weight, magnesium oxide and 8%, by weight, copperoxychloride was added to the coal of a commercial lime kiln. The kiln normally required 1.31±0.31 shells/ton of lime produced. The shells/ton required are summarized in Table I, using various methods of addition. The chemical analysis of the deposit is shown in Table II.

TABLE I

| Period | Shells/ton | Method of Addition |
| --- | --- | --- |
| 3 weeks | 0.80 | continuous addition of 2 lbs/ton of coal |
| 5 weeks | 0.45 | 6 hr slug feed/day for the first 3 weeks and 2 hr slug feed/day for the last 2 weeks at a 2 lbs/ton dosage/day |
| 2 weeks | 0.37 | fed for the first 2 hrs of each 24 hr period at a 24 hr dosage of 0.7 lbs/ton |
| 3 weeks | 0.26 | fed for the first 2 hrs of each 24 hr period at a 24 hr dosage of 0.7 lbs/ton |
| average | 0.53 | |

TABLE II

CHEMICAL ANALYSIS OF DEPOSIT MATERIAL

| Chemical Component | Before Treatment, % | After Treatment, % |
| --- | --- | --- |
| $Al_2O_3$ | 2 | 1 |
| CaO | 86 | 85 |
| $Fe_2O_3$ | 5 | 2 |
| $SiO_2$ | 5 | 4 |
| $Na_2O$ | >3 | >3 |

X-ray diffraction analysis before and after treatment showed the presence of calcium oxide (CaO mp 2614° C.) and calcium silicate, larnite ($Ca_2SiO_4$, mp 2130° C.). Calcium aluminum iron oxide, brown millerite ($Ca_4Al_2Fe_2O_{10}$, mp 1430° C.), however, was only found before treatment.

What is claimed is:

1. A method of inhibiting and dispersing calcium oxide deposit formation in coal-fired lime kilns, comprising burning the coal in the presence of from 0.1 to 5 pounds/ton of coal of a blend of 80 to 95%, by weight, magnesium oxide and 5 to 20%, by weight, copperoxychloride.

* * * * *